United States Patent [19]
Carlson et al.

[11] 3,836,788
[45] Sept. 17, 1974

[54] INTERNAL COMBUSTION ENGINE CRANKING MOTOR CIRCUIT

[75] Inventors: Richard A. Carlson, Pontiac; Robert E. Eddy, Metamora, both of Mich.

[73] Assignee: General Motors Corporation, Detroit, Mich.

[22] Filed: June 28, 1973

[21] Appl. No.: 374,778

[52] U.S. Cl............................ 290/50, 290/38, 290/37
[51] Int. Cl. ............................................. H02p 7/00
[58] Field of Search ................ 290/50, 1, 38, 37, 16

[56] References Cited
UNITED STATES PATENTS

| | | | |
|---|---|---|---|
| 2,912,594 | 11/1959 | Raver.................................... | 290/50 |
| 3,343,057 | 9/1967 | Smith............................... | 290/50 X |
| 3,702,959 | 11/1972 | Le Gloan.............................. | 290/50 |

Primary Examiner—G. R. Simmons
Attorney, Agent, or Firm—Richard G. Stahr

[57] ABSTRACT

An internal combustion engine cranking motor circuit in which a main and an auxiliary battery are connected in series with the cranking motor during the engine cranking operation. Upon the operation of the normally open electrical contacts of an electrical switch to the electrical circuit closed condition, the operating coils of separate electrical relays are energized. Upon the energization of the operating coil of the first relay, the main and auxiliary batteries are connected in series through the normally open contacts thereof and upon the energization of the operating coil of the second relay, the cranking motor is connected in series with the main and auxiliary batteries through the normally open contacts thereof.

4 Claims, 1 Drawing Figure

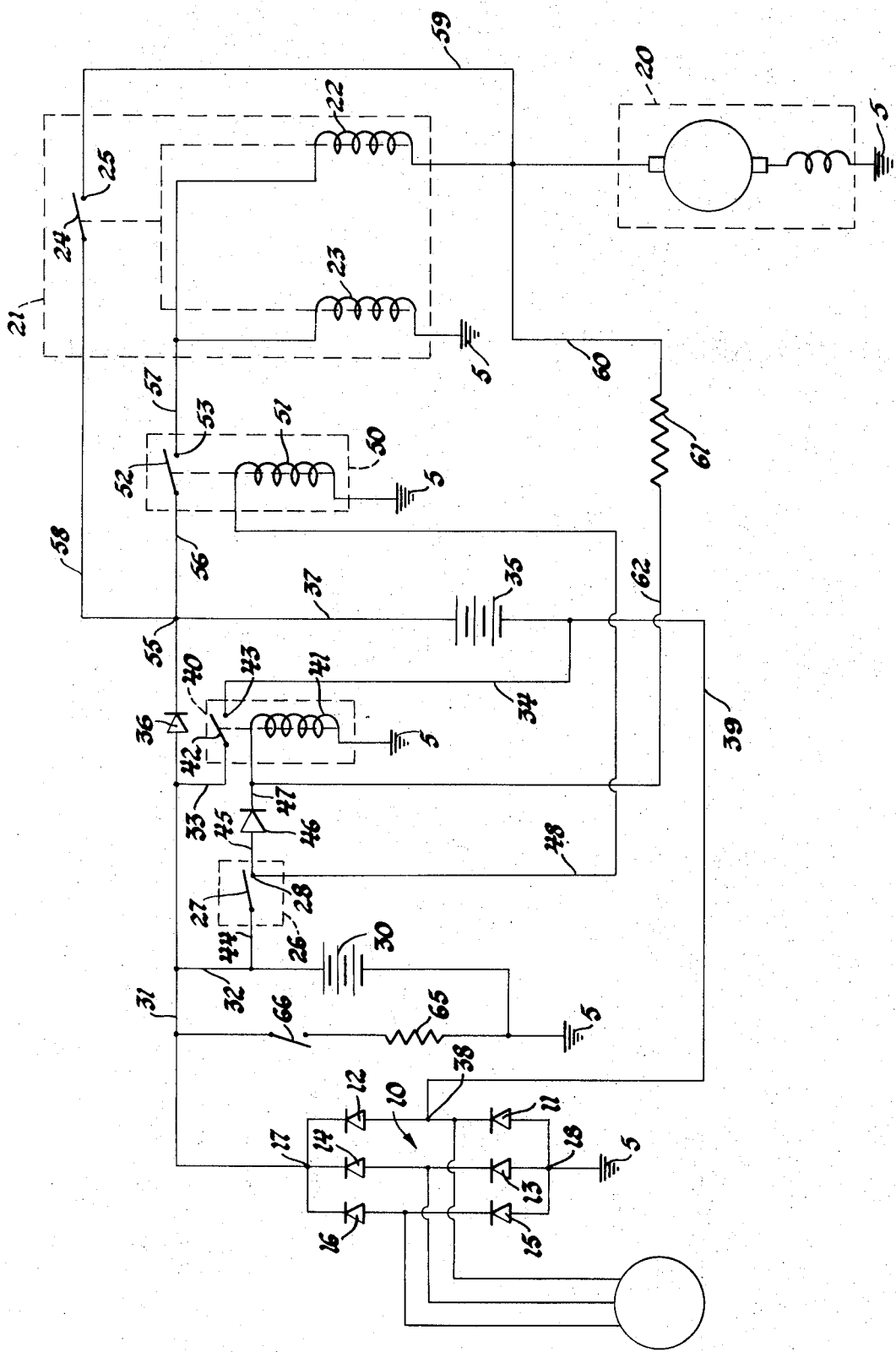

INTERNAL COMBUSTION ENGINE CRANKING MOTOR CIRCUIT

This invention is directed to an internal combustion engine cranking motor circuit and, more specifically, to an internal combustion engine cranking motor circuit wherein a main battery, an auxiliary battery and the cranking motor are connected in series during the engine cranking operation.

As is well known in the automotive art, each modern motor vehicle is equipped with a storage battery of E volts, usually 12 volts in the later models. It has been found that the storage battery may not be able to supply enough energy to crank the engine. This is true of the larger horsepower engines and with the smaller horsepower engines when the battery has become at least partially discharged. Therefore, to provide sufficient electrical energy to crank the associated engine, the use of an auxiliary battery of E' volts connected in series with the main battery and the cranking motor during the cranking operation is desirable.

It is, therefore, an object of this invention to provide an improved internal combustion engine cranking motor energizing circuit.

It is an additional object of this invention to provide an improved internal combustion engine cranking motor energizing circuit wherein two storage batteries and the cranking motor are connected in series during the engine cranking operation.

In accordance with this invention, an internal combustion engine cranking motor energizing circuit is provided wherein, upon the operation of the normally open electrical contacts of an electrical switch to the electrical circuit closed condition, two storage batteries and the electrical cranking motor are connected in series.

For a better understanding of the present invention, together with additional objects, advantages and features thereof, reference is made to the following description and accompanying single FIGURE drawing in which the improved internal combustion engine cranking motor energizing circuit of this invention is set forth in schematic form.

As the point of reference or ground potential is the same point electrically throughout the system, it has been represented in the FIGURE by the accepted schematic symbol and referenced by the numeral 5.

Referring to the FIGURE, the internal combustion engine cranking motor energizing circuit of this invention is set forth in schematic form in combination with a full-wave rectifier circuit 10 of the type having three series connected diode pairs 11–12, 13–14, and 15–16 connected in parallel and positive and negative polarity output circuits 17 and 18, respectively, a cranking motor 20, a cranking motor solenoid 21 having two operating coils, pull-in coil 22 and hold-in coil 23, and normally open electrical contacts 24 and 25 and an electrical switch 26 having normally open electrical contacts 27 and 28. Electrical switch 26 may be two contacts within the conventional automotive type ignition switch well known in the automotive art or it may be a separate single pole-single throw electrical switch if more convenient.

The positive and negative polarity output circuits 17 and 18 of rectifier circuit 10 are connected to the positive and negative polarity output terminals of a main battery 30, respectively, through leads 31 and 32 and through point of reference or ground potential 5, respectively.

The positive polarity output circuit 17 of rectifier circuit 10 is also connected to the positive polarity output terminal of auxiliary battery 35 through lead 31, diode 36 and lead 37 and the negative polarity output terminal of auxiliary battery 35 is connected to the junction 38 between the series connected diode pair 11 and 12 of rectifier circuit 10 through lead 39. It is to be specifically understood that the negative polarity terminal of auxiliary battery 35 may be connected to the junction between the two diodes of any one of the series connected diode pairs of rectifier circuit 10 without departing from the spirit of the invention. That is, the negative polarity terminal of auxiliary battery 35 may also be connected to the junction between series diode pair 13 and 14 or series diode pair 15 and 16 of rectifier circuit 10.

Circuitry responsive to the closure of the normally open contacts 27 and 28 of electrical switch 26 is provided for connecting the main and auxiliary batteries 30 and 35 and cranking motor 20 in series. This circuitry includes relay 40 having an operating coil 41 and two normally open electrical contacts 42 and 43, relay 50 having an operating coil 51 and normally open electrical contacts 52 and 53 and cranking motor solenoid 21.

The positive polarity output terminal of main battery 30 is connected to the negative polarity output terminal of auxiliary battery 35 through the normally open electrical contacts of relay 40 through a circuit which may be traced from the positive polarity output terminal of main battery 30, through leads 32 and 31, lead 33, the normally open electrical contacts 42 and 43 of relay 40 and lead 34 to the negative polarity output terminal of auxiliary battery 35.

The operating coils 41 and 51 of respective relays 40 and 50 are connected in parallel across the positive and negative polarity output terminals of main battery 30 through the normally open electrical contacts of the electrical switch 26 through a circuit which may be traced from the positive polarity output terminal of main battery 30, through lead 44, the normally open electrical contacts 27 and 28 of electrical switch 26 and through respective parallel paths including lead 45, diode 46, lead 47, operating coil 41 of relay 40 and point of reference or ground potential 5 and through lead 48, operating coil 51 of relay 50 and point of reference or ground potential 5.

The operating coils 22 and 23 of cranking motor solenoid 21 are connected in parallel across the series combination of main battery 30 and auxiliary battery 35 through the normally open electrical contacts 52 and 53 of relay 50 through a circuit which may be traced from junction 55, through lead 56, the normally open electrical contacts 52 and 53 of relay 50, lead 57, and through hold-in coil 23 of cranking motor solenoid 21 and point of reference or ground potential 5 and the parallel circuit of pull-in coil 22 of cranking motor solenoid 21 and cranking motor 20 in series and point of reference or ground potential 5.

Cranking motor 20 is connected across the series combination of main battery 30 and auxiliary battery 35 through the normally open electrical contacts of cranking motor solenoid 21 through a circuit which may be traced from junction 55, through lead 58, the normally open electrical contacts 24 and 25 of cranking motor solenoid 21, lead 59, cranking motor 20 and point of reference or ground potential 5.

The operating coil 41 of relay 40 is also connected across the series combination of main battery 30 and auxiliary battery 35 through the normally open electrical contacts of the cranking motor solenoid 21 through a circuit which may be traced from junction 55, through lead 58, normally open electrical contacts 24 and 25 of cranking motor solenoid 21, leads 59 and 60, resistor 61, lead 62, operating coil 41 of relay 40 and point of reference or ground potential 5.

Main battery 30 may also be employed to energize other electrical loads which have been schematically represented in the FIGURE by a resistor 65 which may be connected to main battery 30 through a switch 66. It is to be specifically understood that these electrical loads and the switching device are purely illustrative and in no way form any part of this invention.

Upon the closure of electrical contacts 27 and 28 of electrical switch 26, the energizing circuit previously described is completed for operating coil 41 of relay 40 and for operating coil 51 of relay 50. Upon the energization of operating coil 41 of relay 40, the normally open contacts 42 and 43 thereof are operated to the electrical circuit closed condition to connect main battery 30 in series with auxiliary battery 35 and upon the energization of operating coil 51 of relay 50, the normally open electrical contacts 52 and 53 thereof are operated to the electrical circuit closed condition to connect the parallel combination of pull-in coil 22 and hold-in coil 23 of cranking motor solenoid 21 across the series combination of main battery 30 and auxiliary battery 35. Upon the energization of the operating coils of cranking motor solenoid 21, the normally open electrical contacts 24 and 25 thereof are operated to the electrical circuit closed condition. With electrical contacts 24 and 25 of cranking motor solenoid 21 operated to the electrical circuit closed condition, cranking motor 20 and operating coil 41 of relay 40 are connected across the series combination of main battery 30 and auxiliary battery 35. Consequently, upon the closure of the normally open electrical contacts 27 and 28 of electrical switch 26, main battery 30 and auxiliary battery 35 are connected in series through the electrical contacts 42 and 43 of relay 40 and an energizing circuit is completed for the operating coils 22 and 23 of cranking motor solenoid 21 through the electrical contacts 52 and 53 of relay 50.

With electrical contacts 24 and 25 of cranking motor solenoid 21 operated to the electrical circuit closed condition, pull-in coil 22 of cranking motor solenoid 21 is shorted out thereby, however, hold-in coil 23 remains energized to maintain contacts 24 and 25 in the electrical circuit closed condition to maintain the energizing circuit for cranking motor 20.

When the engine starts, electrical contacts 27 and 28 of electrical switch 26 are operated to the electrical circuit open condition to interrupt the energizing circuit for operating coils 41 and 51 of respective relays 40 and 50 across main battery 30. However, since operating coil 41 of relay 40 is connected across the series combination of main battery 30 and auxiliary battery 35 through the closed electrical contacts 24 and 25 of cranking motor solenoid 21, leads 59 and 60, resistor 61 and lead 62, the electrical contacts 42 and 43 remain operated to the electrical circuit closed condition. However, upon the interruption of the energizing circuit for operating coil 51 of relay 50, the normally open contacts 52 and 53 spontaneously operate to the electrical circuit open condition to interrupt the energizing circuit for hold-in coil 23 of cranking motor solenoid 21. Upon the interruption of this energizing circuit, the electrical contacts 24 and 25 of cranking motor solenoid 21 spontaneously return to the electrical circuit open condition to interrupt the energizing circuit for cranking motor 20 and for operating coil 41 of relay 40. Consequently, cranking motor 20 no longer cranks the engine and the electrical contacts 42 and 43 of relay 40 spontaneously return to the electrical circuit open condition and the circuit is thus enabled for the next cranking operation.

Diode 36 serves to isolate main battery 30 from auxiliary battery 35, consequently, auxiliary battery 35 is used only during the cranking operation and does not supply power to any other electrical load. Diode 46 isolates operating coil 51 of relay 50 from the circuit which maintains operating coil 41 of relay 40 energized upon the operation of electrical contacts 27 and 28 of switch 26 to the electrical circuit open condition. Without this diode, both relays 40 and 50 would remain energized and, consequently, the circuit would never be enabled for the next cranking operation. The reason relay 40 is maintained in the energized condition upon the operation of contacts 27 and 28 of switch 26 to the electrical circuit open condition is to insure that the cranking motor circuit is interrupted by the contacts 24 and 25 of the cranking motor solenoid, which are designed to break this heavy cranking motor current, rather than by the comparatively lighter electrical contacts 42 and 43 of relay 40.

It may be noted that main battery 30 will not discharge through or serve to charge auxiliary battery 35 as it is isolated therefrom by diode 11 of rectifier circuit 10.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. An internal combustion engine cranking motor energizing circuit comprising in combination with a full-wave rectifier circuit of the type having three series connected diode pairs connected in parallel and positive and negative polarity output circuits, a cranking motor, a cranking motor solenoid having two operating coils and normally open electrical contacts and an electrical switch having normally open electrical contacts; a main and an auxiliary battery, each having positive and negative polarity output terminals; and diode; means for connecting said positive and negative polarity output circuits of said rectifier circuit to said positive and negative polarity output terminals of said main battery, respectively; means for connecting said positive polarity output circuit of said rectifier circuit to said positive polarity output terminal of said auxiliary battery through said diode; means for connecting said negative polarity output terminal of said auxiliary battery to the junction between the two diodes of any one of said series connected diode pairs of said rectifier circuit; and means responsive to the closure of said normally open contacts of said electrical switch for connecting said main and auxiliary batteries and said cranking motor in series.

2. An internal combustion engine cranking motor energizing circuit comprising in combination with a full-wave rectifier circuit of the type having three series connected diode pairs connected in parallel and positive and negative polarity output circuits, a cranking motor, a cranking motor solenoid having two operating coils and normally open electrical contacts and an electrical switch having normally open electrical contacts; a main and an auxiliary battery, each having positive and negative polarity output terminals; a diode; means for connecting said positive and negative polarity output circuits of said rectifier circuit to said positive and negative polarity output terminals of said main battery, respectively; means for connecting said positive polarity output circuit of said rectifier circuit to said positive polarity output terminal of said auxiliary battery through said diode; means for connecting said negative polarity output terminal of said auxiliary battery to the junction between the two diodes of any one of said series connected diode pairs of said rectifier circuit; means responsive to the closure of said normally open electrical contacts of said electrical switch for connecting said main and auxiliary batteries in series and for completing an energizing circuit for said operating coils of said cranking motor solenoid; and means including said normally open electrical contacts of said cranking motor solenoid for connecting said cranking motor across the series combination of said main and auxiliary batteries.

3. An internal combustion engine cranking motor energizing circuit comprising in combination with a full-wave rectifier circuit of the type having three series connected diode pairs connected in parallel and positive and negative polarity output circuits, a cranking motor, a cranking motor solenoid having two operating coils and normally open electrical contacts and an electrical switch having normally open electrical contacts; a main and an auxiliary battery, each having positive and negative polarity output terminals; a diode; means for connecting said positive and negative polarity output circuits of said rectifier circuit to said positive and negative polarity output terminals of said main battery, respectively; means for connecting said positive polarity output circuit of said rectifier circuit to said positive polarity output terminal of said auxiliary battery through said diode; means for connecting said negative polarity output terminal of said auxiliary battery to the junction between the two diodes of any one of said series connected diode pairs of said rectifier circuit; first and second relays, each having an operating coil and normally open electrical contacts; means for connecting said positive polarity output terminal of said main battery to said negative polarity output terminal of said auxiliary battery through said normally open electrical contacts of said first relay for connecting said main and auxiliary batteries in series upon the energization of said operating coil of said first relay; means for connecting said operating coils of said first and second relays in parallel across said positive and negative polarity output terminals of said main battery through said normally open electrical contacts of said electrical switch; means for connecting said operating coils of said cranking motor solenoid in parallel across the series combination of said main and auxiliary batteries through said normally open electrical contacts of said second relay; and means for connecting said cranking motor across the series combination of said main and auxiliary batteries through said normally open electrical contacts of said cranking motor solenoid.

4. An internal combustion engine cranking motor energizing circuit comprising in combination with a full-wave rectifier circuit of the type having three series connected diode pairs connected in parallel and positive and negative polarity output circuits, a cranking motor, a cranking motor solenoid having two operating coils and normally open electrical contacts and an electrical switch having normally open electrical contacts; a main and an auxiliary battery, each having positive and negative polarity output terminals; a diode; means for connecting said positive and negative polarity output circuits of said rectifier circuit to said positive and negative polarity output terminals of said main battery, respectively; means for connecting said positive polarity output circuit of said rectifier circuit to said positive polarity output terminal of said auxiliary battery through said diode; means for connecting said negative polarity output terminal of said auxiliary battery to the junction between the two diodes of any one of said series connected diode pairs of said rectifier circuit; first and second relays, each having an operating coil and normally open electrical contacts; means for connecting said positive polarity output terminal of said main battery to said negative polarity output terminal of said auxiliary battery through said normally open electrical contacts of said first relay for connecting said main and auxiliary batteries in series upon the energization of said operating coil of said first relay; means for connecting said operating coils of said first and second relays in parallel across said positive and negative polarity output terminals of said main battery through said normally open electrical contacts of said electrical switch; means for connecting said operating coils of said cranking motor solenoid in parallel across the series combination of said main and auxiliary batteries through said normally open electrical contacts of said second relay; means for connecting said cranking motor across the series combination of said main and auxiliary batteries through said normally open electrical contacts of said cranking motor solenoid; and means for connecting said operating coil of said first relay across the series combination of said main and auxiliary batteries through said normally open electrical contacts of said cranking motor solenoid.

* * * * *